(No Model.)
A. WILBUR.
Car Wheel.
No. 235,835. Patented Dec. 21, 1880.
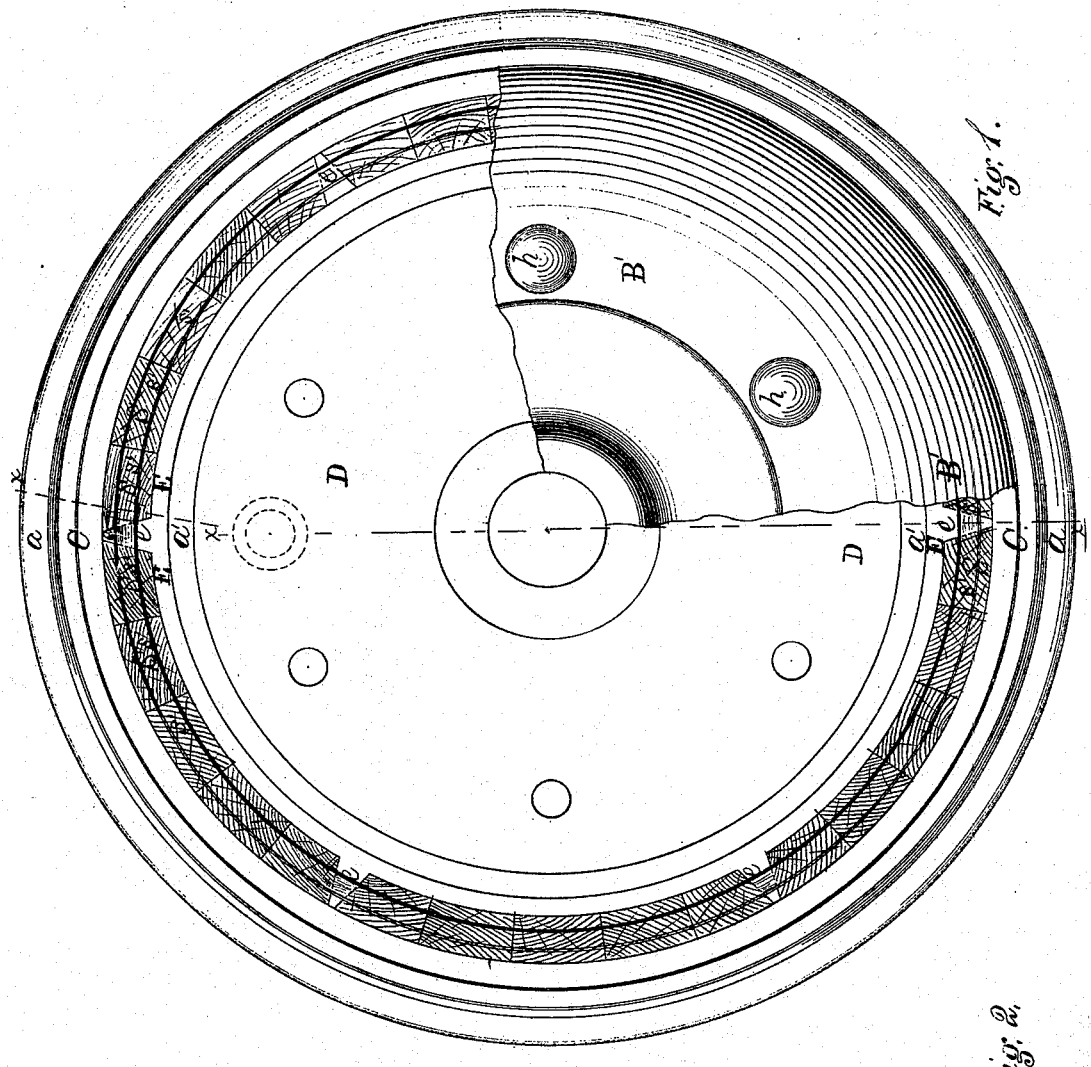
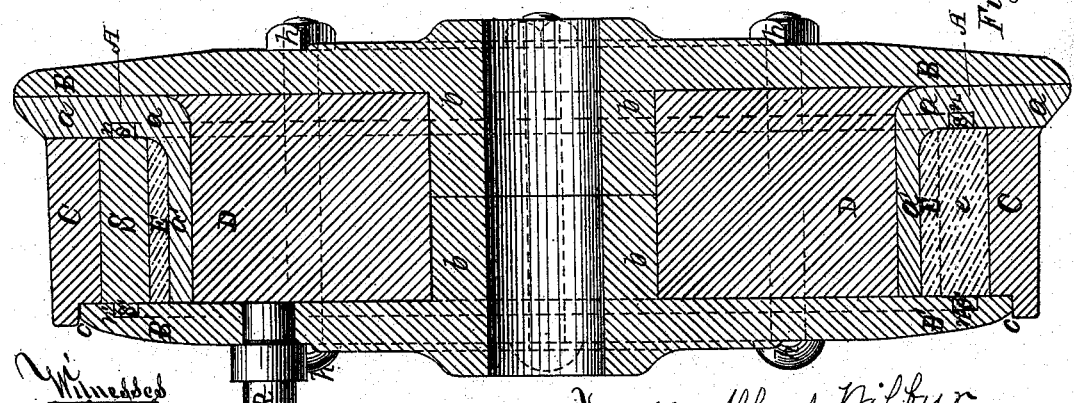

UNITED STATES PATENT OFFICE.

ALFRED WILBUR, OF ALLEGHENY, PENNSYLVANIA.

CAR-WHEEL.

SPECIFICATION forming part of Letters Patent No. 235,835, dated December 21, 1880.

Application filed November 6, 1880. (No model.)

*To all whom it may concern:*

Be it known that I, ALFRED WILBUR, of Allegheny city, county of Allegheny, State of Pennsylvania, have invented or discovered a new and useful Improvement in Car and Locomotive Drive-Wheels; and I do hereby declare the following to be a full, clear, concise, and exact description thereof, reference being had to the accompanying drawings, making a part of this specification, in which—like letters indicating like parts—

Figure 1 is a view, in side elevation, of a car-wheel with a part of the side disk or cap broken away, the same being illustrative of my invention; and Fig. 2 is a transverse sectional view of the same, such section being taken in the plane of the line $x\ x$, Fig. 1.

My present invention relates to an improvement in the class of car-wheels shown and described in application for patent of the United States filed by me October 9, 1880; and it consists in adding to such wheel certain features of construction, between the tire and the rim or bed, by which I adapt it for use as a locomotive drive-wheel.

In the application referred to I have shown and described a car-wheel having two side caps or disks, B B', carrying at their centers hub-extensions $b\ b$, also a rim, A, having a flange, $a$, and tread $a'$, which parts are backed and clamped on opposite sides by the two caps with a central filling, D, bolts for binding the parts of the wheel together, and an unflanged steel tire, C, which, in the prior invention, was shrunk or seated directly on the tread $a'$ of the rim. In my present invention these parts are constructed substantially as described in the case referred to. The rim A is made of wrought metal—iron or steel—though in view of other features of construction presently to be described I prefer to make the flange part $a$ somewhat thicker than is ordinarily required for the tread $a'$. This rim may be made conveniently from a plate of wrought metal by what is known as the "flanging" operation. In so doing an annulus of metal is sheared from the plate having a diameter equal to that of the wheel-flange $a$, and the inner edge of this annulus is turned outward by the usual flanging operation to form the tread $a'$ of the rim. In this operation the part $a$ may be upset or thickened somewhat, or the part $a'$ may be drawn out. The rim thus formed is bound between the disks or caps B B' by means of a suitable number of bolts, $h$, and the annular space between the rim and the hub $b\ b$ is filled tight with wood or other suitable non-resonant material, D. The larger cap, B, is made equal in diameter to the flange $a$ of the wheel, and is fitted snugly against the flat outer face of the flange, thus supporting it, and giving, in effect, a double wheel-flange, with corresponding increase of strength and security. The other disk or cap, B', has a diameter in excess of that of the tread $a'$ of the rim, against the edge of which it bears; and between the projecting periphery of this cap and the flange part $a$ of the rim I introduce the following features of improvement:

Upon the outer face of tread $a'$ is fitted a metallic band, E, made, by preference, of cast-iron. This band has projecting from its outer face a number of radial lugs, $e$, which serve as guards or guides for bringing the tire C concentric with the wheel when it is put in place. In fitting the band E its inner face is turned true and of proper size to fit tightly and firmly on the tread $a'$, though keys may be employed, if desired, to tighten the band on the tread. The projecting edges or extremities of the lugs $e$ are also turned true, and, by preference, the steel tire C is shrunk onto the points or edges of these lugs. I have shown six of these lugs $e$, arranged at equal distances around the band E. A greater or less number may be employed, however, if desired. The spaces between the tire C and band E are then filled with wooden blocks or keys S, which are driven tight into and completely fill such spaces, their edges fitting closely against each other and against the sides of the lugs $e$. As these lugs are, by preference, tapered, as shown, to a comparatively thin outer edge or point, the succession of keys or blocks S will give practically a continuous wooden bed for the tire, which possesses several important advantages. It gives greater elasticity, and thereby prevents breakage, and also prevents tendency of the tire to draw or stretch, and thus become loose. It also protects, to an important degree, both the tire and the rim or band against the injurious effects of frost. As a means of securing these blocks or keys in place independent of the tire, I make annular grooves $n\ n'$, one on the inner face of flange $a$, and one opposite, in the inner face of cap B'. (See Fig. 2.) Both these grooves open into the space occupied by the blocks or keys S, and they receive tongues s s', which project from the ends of the keys. The blocks or keys are thus held in place both by these tongues and by the end clamp or pressure between the cap B' and flange a, so that in case the tire C should break, the wooden bed S will still have sufficient strength to permit of running the wheel thereon for a considerable distance with safety and without material injury to the other parts of the wheel.

The tire C is a plain unflanged band of steel, one edge of which abuts against the flange part a. In its opposite lower corner a rabbeted groove, c, receives and covers the periphery of the cap B'. The tire is thus effectually prevented from coming off on either side of the wheel, and the greatest possible security is thereby attained without the use of bolts, and consequent weakening of the tire by bolt-holes.

It will also be observed that the keys S and band E are completely boxed in, and not only are the keys thereby protected from moisture, and consequent shrinking and swelling, but by no possibility can they be displaced while the wheel remains intact, and, as before explained, they are well secured, even though the tire should be broken. This feature of boxing in the several parts of the wheel, including practically the tire, the keys, or blocks which bed the tire, the band which forms the tire-guard and key-seat, by means of the side caps or disks, so that each and all of these parts are most effectually prevented from displacement, and also so that each is independently or separately secured, even though the next outer part, toward the tire, should give way, is, so far as I am aware, new with myself; and I consider it an improvement of the greatest importance, especially in drive-wheels, though the same features may be embodied in ordinary car-wheels to advantage.

The breaking down of drive-wheels has in the past been a fruitful source of loss, both of life and of property.

As the tire has heretofore been keyed or secured on the body of the wheel, a breakage of the tire has not only rendered the wheel unfit for further use until repaired, but has often resulted in a complete wreck of the wheel and of the whole or a part of the train. Such a wreck can scarcely occur from any breakage that can take place in my improved wheel. The strength of such a wheel is much greater than that of the ordinary cast spoke-wheel, since there is in it none of that internal strain which often exists in cast wheels, and which necessarily weakens the wheel where it does exist.

A wrist, R, for piston and connecting rods, may be added by bolting to the cap B' or through the entire wheel, as preferred.

One or both of the grooves n n' may be made of equal width with the thickness of the keys or blocks S, so that the entire ends of these blocks may fit therein. But, as the ends s' may become more or less battered in driving, I prefer to turn them down to an annular tongue, as shown. I do not limit my invention, however, to any particular form of such tongues or grooves, nor to any particular location of the same on the ends of the keys, and such tongues and grooves may be omitted entirely, or on one side, and still secure many of the advantages of my improvement.

Instead of fitting the band E upon the tread a', to form a seat for keys S, such seat, especially in the lighter class of wheels, may be directly on the tread a', without the use of the band, and in such case the keys and part of the tire would still be boxed in and secured against displacement, as hereinbefore described, and these and similar modifications in the end and bottom bearings of the keys I consider as coming within my invention.

I claim herein as my invention—

1. A car-wheel composed of side caps or disks, B B', having central hub-extensions, b b, rim A, elastic filling D between the hub and rim, band E, secured on the tread of the rim, tire C, and elastic bed S between the tire and band, such parts being arranged and combined substantially as set forth.

2. In a locomotive drive-wheel, the combination of rim A, having a flange, a, and tread a', band E, with a series of lugs, e, on its outer face, tire C, blocks or keys S, and caps or disks B B', the cap B' extending onto or covering the edges of the band, keys, and tire on one side, and clamping them against the rim-flange a on the opposite side, substantially as set forth.

3. A car-wheel rim, A, having a tread, a', and flange a, with an annular groove, n, in the inner side face of the flange, in combination with cap B', bolted to the side face of the wheel opposite the flange a, such cap having a diameter in excess of the diameter of the tread a', with an annular groove in its inner face, outside of the bearing of the tread, tire C, and keys S, the latter having end extensions adapted to enter the grooves n n', substantially as described.

4. A car-wheel having a rim, A, consisting of flange a and tread a', an unflanged tire, C, wooden bed S between the tire and tread, such tire C and bed S abutting on one edge against the flange a, and a cap or disk, B', bolted to the face of the wheel opposite the flange, and extending onto or covering the other or adjacent edge of the bed and tire, substantially as and for the purposes set forth.

In testimony whereof I have hereunto set my hand.

ALFRED WILBUR.

Witnesses:
R. H. WHITTLESEY,
C. S. PARKER.